Sept. 3, 1968  E. I. VALYI  3,399,428

APPARATUS FOR MOLDING PLASTIC MATERIAL

Filed June 10, 1966

INVENTOR
EMERY I. VALYI

BY

ATTORNEY 3,399,428
APPARATUS FOR MOLDING PLASTIC MATERIAL
Emery I. Valyi, 5200 Sycamore Ave.,
Bronx, N.Y. 10471
Filed June 10, 1966, Ser. No. 556,642
4 Claims. (Cl. 18—30)

This invention relates to apparatus for molding hot flowable plastic materials which are capable of hardening, decomposing, or of chemical change if allowed to accumulate or to dwell in passages or other parts of the apparatus for any substantial length of time.

In the molding of heat sensitive or heat decomposable plastics, including particularly polyvinyl-chloride (PVC), it is important to arrange the passages for the flow of hot plastic in such a manner that no pockets or crevices are present in which the plastic may stagnate and, due to extended dwell at elevated temperature, commence to decompose. This problem is particularly critical whenever it is necessary, for reasons of machine or tool layout, to cause a change in flow direction of the hot plastic.

In one embodiment the invention may be applied to a structure including a transition piece containing a right-angle bend, at one end of which a conventional extruder supplies molten plastic, such as PVC, and from the other end of which molten plastic may flow into an extrusion die or into a mold cavity. To provide such a bend it is customary to drill intersecting passages from each end and to plug one of them with a contoured plug. The radii necessary to provide a smooth flow at the intersection of the passages are then finished and the surface of the flow passage is finished by polishing. Obviously, if the passage is comparatively narrow this becomes a very difficult task.

As an alternate, the transition piece may be split into two halves which are held together under sufficient external pressure, to counteract the pressure of the plastic. It is possible to provide the passage with excellent finish and appropriate radii in this manner. However well finished the parting line constitutes a crack capable of retaining plastic.

It is an object of this invention to provide means for overcoming the above difficulties and to provide plastic handling apparatus of simple construction having passages so arranged that accumulation of plastic in pockets or at sharp bends is avoided.

Various other objects and advantages will be apparent as the nature of the invention is more fully disclosed. The nature of the invention will be better understood from the following description, taken in connection with the accompanying drawing in which a specific embodiment has been set forth for purposes of illustration.

Figure 1:
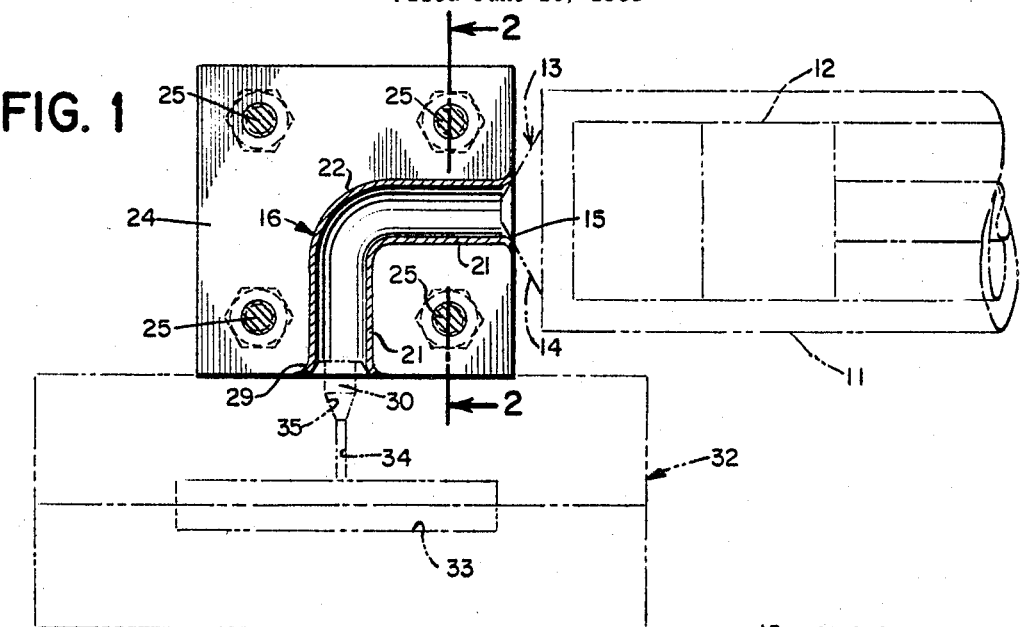
FIG. 1 is a longitudinal sectional view of a portion of a molding apparatus embodying the invention with certain elements shown in phantom lines.
Figure 2:
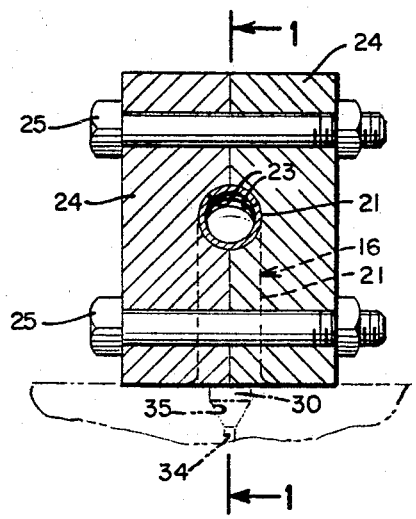
FIG. 2 is a transverse section taken on the line 2—2 of FIG. 1 showing the split block and liner tube.
Figure 3:
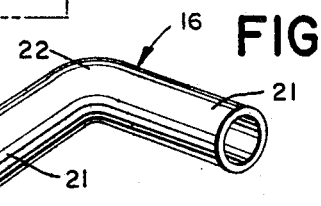
FIG. 3 is a perspective view of the liner tube.
Figure 4:
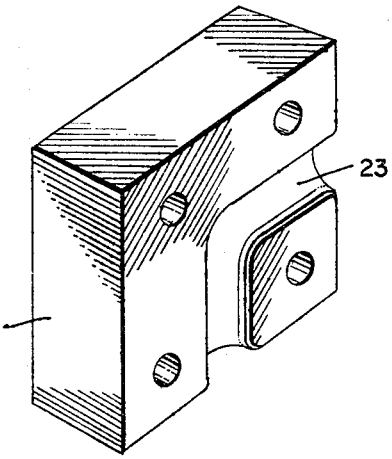
FIG. 4 is a perspective view of one of the halves of the split block.

Referring to the drawing more in detail the invention is shown as embodied in a plastic molding apparatus including an injection cylinder 11 containing the hot flowable plastic and having a piston 12 adapted to provide the injection pressure. The cylinder 11 terminates in a nozzle 13 having a conical end surface 14 which fits into and is seated against the flared end 15 of a thin-walled seamless tube 16.

The tube is flared suitably so as to provide a seal for the extruder thereby assuring that hot plastic will not enter behind the tube. Such tubes may be manufactured by molding or by forming operations in conventional ways, at modest costs, so that they may be discarded whenever operation of the injection molding or extrusion machinery needs to be interrupted for a prolonged period of time. The tubes may be made of plastics resistant to attack by the plastic to be molded, such as silicone or Teflon; or else they may be made of thin-walled tubing which may also be provided with an internal finish resistant to attack by the hot plastic, such as anodically oxidized aluminum or thin-walled carbon steel.

The tube 16 is shown as having a pair of straight portions 21 joined by an arcuate portion 22. The tube 16 is also formed with a flared discharge end 29 against which a conical tip 30 of a mold 32 is seated. The mold 32 has a mold cavity 33 communicating through passage 34 and recess 35 with the tip 30. The tube 16 may be a thin-walled tube of seamless type having a smooth interior surface with no pockets or crevices in which the plastc material can become lodged. The tube is held confined in milled channels 23 in the two halves of a split block 24 which are clamped together by bolts 25. The arrangement is such that the tube can be removed and replaced by opening the block 24.

As pointed out above the tube can be readily formed in the desired shape and corresponding passages 23 can readily be milled or cut in the blocks 24.

Since the plastic does not come into contact with the milled passages 23 the nature of the seam formed by the joining of the blocks is not critical and accurate machining is not required.

In operation, as the plastic is injected into the end of the tube 16 it flows along the tube and around the bend 22 into the mold 32. If the operation is halted for any reason, the tube 16 can be removed and purged or discarded, so that no accumulation of plastic occurs.

While the invention has been shown as applied to a molding machine it is obvious that it may be adapted to various other uses in injection molding, particularly where it is necessary to provide a curved or bent passage for the plastic material.

The invention is also applicable to a long straight passage wherein the plastic might accumulate particularly during interruptions in the molding operation. In such case the tube may be removed or purged or discarded as required.

What is claimed is:

1. In a plastic molding apparatus a seamless tube having a smooth inner surface for the unimpeded flow of plastic, a split block composed of parts having mating channels formed therein and conforming to the shape of said tube, means clamping said parts together with the tube removably clamped in said channels, means introducing plastic material into one end of said tube, and a member positioned to receive said plastic from the other end of said tube.

2. In a plastic molding apparatus as set forth in claim 1 in which at least a portion of said tube and of the corresponding channels is curved.

3. Apparatus as set forth in claim 1 in which at least the inlet end of said tube is flared and a plastic injection element is formed with a nozzle having a conical end surface seated in said flared end of said tube.

4. Apparatus as set forth in claim 1 in which a mold having a mold cavity is disposed to receive the plastic from the discharge end of said tube.

References Cited

UNITED STATES PATENTS

| | | |
|---|---|---|
| 2,330,369 | 9/1943 | Marsh. |
| 3,091,812 | 6/1963 | Witkowski. |
| 3,095,604 | 7/1963 | Ackaret. |
| 3,262,156 | 7/1966 | Jung et al. |
| 3,314,109 | 4/1967 | Barton et al. |

J. HOWARD FLINT, JR., *Primary Examiner.*